United States Patent [19]

Kreiselmeier et al.

[11] 4,140,607

[45] Feb. 20, 1979

[54] METHOD FOR MODIFYING THE SURFACE OF POLYMERIC SUBSTRATE MATERIALS BY MEANS OF ELECTRON BOMBARDMENT IN A LOW PRESSURE GAS DISCHARGE

[75] Inventors: Hans-Gert Kreiselmeier, Karl-Marx-Stadt; Manfred Rost, Coswig; Jochen Klemm, Niederwiesa, all of German Democratic Rep.

[73] Assignee: Forchungsinstitut fur Textiltechnologie, Karl-Marx-Stadt, German Democratic Rep.

[21] Appl. No.: 743,880

[22] Filed: Nov. 22, 1976

[51] Int. Cl.² ............................................. B01K 1/00
[52] U.S. Cl. ........................................ 204/168; 204/165
[58] Field of Search ................................ 204/165, 168

[56] References Cited

U.S. PATENT DOCUMENTS

| | | | |
|---|---|---|---|
| 3,067,119 | 12/1962 | Ramaika | 204/168 |
| 3,068,510 | 12/1962 | Coleman | 204/168 |
| 3,179,482 | 4/1965 | Kassenbeck | 8/2 |
| 3,274,088 | 9/1966 | Wolinski | 204/165 |
| 3,274,089 | 9/1966 | Wolinski | 204/165 |
| 3,274,091 | 9/1966 | Amborski | 204/165 |
| 3,475,307 | 10/1969 | Knox et al. | 204/168 |
| 3,600,122 | 8/1971 | Coleman | 8/115.7 |
| 3,661,735 | 5/1972 | Drelich | 204/165 |
| 3,692,653 | 9/1972 | Drelich et al. | 204/165 |
| 3,817,701 | 6/1974 | Thorsen | 8/116 R |

*Primary Examiner*—F. C. Edmundson
*Attorney, Agent, or Firm*—Nolte & Nolte

[57] ABSTRACT

A method of modifying the surface of polymeric substrate materials, such as textile fabric including woven polymeric textile or textile fibers, by means of electron bombardment in a low pressure gas discharge medium to produce chemical and/or physical changes in the thus treated surface thereby improving the technological properties of the polymeric material, e.g., improved anti-static properties, dye absorption, dirt resistance, releasing of dirt absorbed and hydrophilation, among others.

27 Claims, 1 Drawing Figure

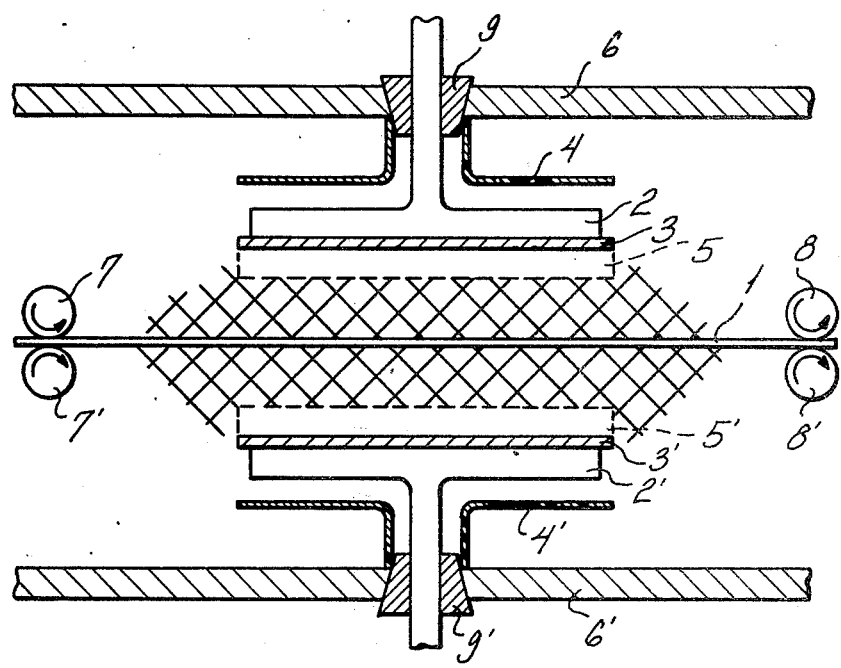

METHOD FOR MODIFYING THE SURFACE OF POLYMERIC SUBSTRATE MATERIALS BY MEANS OF ELECTRON BOMBARDMENT IN A LOW PRESSURE GAS DISCHARGE

BACKGROUND OF THE INVENTION

1. Field of the Invention

The invention relates to a method of modifying the surface of polymeric substrate materials, such as woven polymeric textile surface formations, fibers or sheets, by means of electron bombardment, in a low pressure discharge medium, for the purpose of producing chemical and/or physical changes in these surfaces, thereby improving the technological properties thereof.

2. Description of the Prior Art

Methods and equipment for modifying the surfaces of polymeric solid bodies through bombardment with high-energy electrons are known. In this respect, electron accelerators which impart to the electrons energy amounting to 100 kiloelectron volts up to several megaelectron volts are used. Such equipment may include Van de Graaff generators or insulated core transformers. The essential feature of such a irradiation process is that the depth of penetration of the electrons into the solid body which is dependent upon the amount of the electron energy supplied is greater than the thickness of the substrate material.

Electron accelerators are very expensive and the necessary means for producing high voltage, and for guiding the beam often exceed the capacities of the equipment on hand. Moreover, major safety measures must be employed in order to protect the operating personnel from harmful radiation effects.

Still further, methods and equipment are known, wherein the surface of the solid body to be treated is brought in contact with ionized gases. The ionized gas is produced by glow, corona, or spark discharge. In such methods, interaction takes place between the free electrons, the ions and the excited neutral particles present in the discharge, and the solid body surface. However, the interaction energies amount only to a few electron volts, on the average. The energy of the electrons impinging on to solid body surfaces in these gas discharge installations, are less, by several orders of magnitude than those electron energies which are produced by the accelerator method, which causes their depth of penetration to be limited to less than 1 micrometer. Having regard to the technical expense and the operational protective measures, plasma plants give rise to less problems then electron accelerators, although, for the continuous operation of vacuum treatment plant, locks with pumps of high suction capacity are necessary. However, in the known gas discharge treatment installations, only the energy depleted and weak diffusion currents of the charge carriers are utilized, so that, due to the required exposure time of a few minutes necessary to obtain the desired technological effects, the productivity of these installations is inadequate for many technical uses.

Representative prior art, as above described, may be found in U.S. Pat. No. 3,179,482 to Kassenbeck, issued Apr. 20, 1965 and U.S. Pat. No. 3,600,122 to Coleman, issued Aug. 17, 1971. The former patent discloses a process of treating, particularly for dyeing wool, for example, by subjecting the substrate material to ionic bombardment for periods not less than 3 minutes and up to 10 minutes, and then subjecting the treated material to a dyeing medium. The latter patent disclosss a two zone system of grafting an ethylenically unsaturated monomer to a polymeric substrate. The first zone involves moving the substrate through a "spark discharge" in a first zone containing an initiator gas. Following activation of the surface, the substrate is moved to a second zone in which the activated surface is exposed to a free radical reactive substance that chemically reacts with the free radical sites.

SUMMARY OF THE INVENTION

It is, therefore, among one of the principle objectives of the invention to provide a method which will make possible shorter processing periods, compared to the known method of ionized gas treatement, in order to modify a large surface of polymeric substrate material, to obtain such effects as radical formation, hydrophilation, adhesion improvement and improved dye absorption, in the surface of the polymeric substrate, with a low expense for equipment.

It is also an object of the invention to modify the surface of polymeric substrate material, such as, for example woven polymeric textile surface formations, fibers foils, or sheets, by bombarding them with electrons within a range of kiloelectron volts, in a low pressure gas discharge medium, in a manner in which the process conditions are easily controlled.

To this end, and in accordance with the invention, a polymeric textile product is guided between flat area electrodes which are negatively biased against the ionized gas present within the vacuum vessel, are shielded on the side facing away from the textile product by means of a grounded metal sheet which lies parallel to the direction of the product movement and are covered on the side facing the textile product with a conductive or non-conductive material. This product is guided past the electrodes at a distance from the electrode material, which is greater than the dark space which is formed in front of the area electrodes; i.e., on the sides facing the product.

DESCRIPTION OF THE PREFERRED EMBODIMENTS

In the embodiment illustrated schematically in the drawing, the area electrodes 2 and 2' are symmetrically arranged within a vacuum chamber with the walls 6, 6', in which the low pressure discharge plasma is formed. Between the area electrodes 2, 2', the material to be treated (a textile sheet) 1 is being continuously passed through by means of feed rollers 7, 7' and removal rollers 8, 8'. The current to the area electrodes 2, 2' is supplied by an HF or d.c. generator, not shown in the illustration. The area electrodes 2, 2' are coated on the side facing the material to be treated 1, with a material 3, 3', which, according to the invention, produces in combination with the discharge gas, the desired yield of secondary electrons. In front of the area electrodes 2, 2' which are negatively biased against the plasma and which are coated with the material 3, 3', a potential gradient is formed which becomes visible as non-luminous region, i.e., the so called dark space 5, 5'. Under the discharge conditions which can be selected in each instance, i.e., a gas pressure between 1 and 100 Pascal and a capacity of 0.1 to 4 Watt/cm$^2$, the thickness of the dark space 5, 5' amounts to approximately 1 cm. The distance between the area electrodes 2, 2' coated with the material 3, 3', and the material to be treated 1 has to be so selected as to be larger than the thickness of the dark space 5, 5', specifically 2 to 5 times larger, i.e., 2 to 5 cm.

In order to avoid the build-up of a discharge on the reverse side of the area electrodes 2, 2' (i.e., the side facing away from the material to be treated 1, the area electrodes 2, 2' are shielded by a grounded metal sheet 4, 4'. The distance between the area electrodes 2, 2' and the metal sheet 4, 4' should be smaller than the thickness of the dark space 5, 5', however, large enough to avoid HF losses. The sealings (gaskets) of the vacuum chamber are depicted by reference numerals 9, 9'.

In order to be able to control the treatment intensity which is measured, for example, on the wicking action of a woven polymeric textile surface formations formed of hydrophobic fibers, it is preferable to use silicon dioxide cover as the material for the area electrodes, and argon as the discharge gas for obtaining a low treatment intensity, and to use an aluminum-oxygen combination for achieving higher treatment intensity. A gas mixture may also be utilized as the discharge gas. A DC discharge in a range of a few Pascals is used for conductive electrode material or a high-frequency discharge, within a range of a few Pascals is used for non-conductive electrode material.

The positive ions which impinge on the negatively biased area electrode produce Gamma secondary electrons the number of which is essentially influenced, per impinging ion, on the combination electrode material-/ion type and on the ion energy. The Gamma secondary electrons are accelerated above the dark space in front of the electrode by the potential differential which exists between the electrode surface and the plasma, and are impinged on the surface of the polymeric textile material lying opposite the area electrode. The distance between the area electrode and the polymeric textile is selected to be 2 to 5 times greater than the dark space thickness, and lies within a range of 2 to 5 cm. The Gamma secondary electrons which impinge on the processed products obtain energies which approximately correspond to the voltage gradient above the dark space and lie within a range of 0.5 to 2 kV.

The energy of the Gamma secondary electrons which impinge upon the polymeric textile product is adjusted above the voltage on the area electrode and the current density is preselected through the selection of the combination electrode material and discharge gas; preferable silicon dioxide (quartz) and argon for lower current densities and aluminum and oxygen for higher current densities, and also through the discharge parameters. The electrode material and the discharge gas are so combined that the inevitable sputtering of the area electrode during the ion bombardment will not cause impairment of the treated product.

Moreover, a polymer may be chosen as the electrode material which is intensively degraded by the effect of the ion bombardment and which splits off monomeric fragments which accumulate in the gas atmosphere. The monomer may be grafted onto the surface of the treated product, the surface of which has been activated by irradiation with secondary electrons. This makes it possible to carry out, simultaneously, monomer production, activation of the polymeric surface and grafting of monomer.

By using the low pressure gas discharge with DC or high-frequency power supply to modify the surface of the polymeric textile products, in the manner according to the invention, the following advantages result: the substantially known modification of polymeric surfaces through the inaction with ionized gases is considerably intensified, due to the utilization of secondary electrons in the kiloelectron volt range, which occur particularly markedly in special electrode configuration in accordance with the invention. Consequently, treatment and activation periods of less than 15 seconds can be achieved for the subsequent finishing reactions so that, for obtaining certain already known modification effects, ionized gas treatment first becomes economically feasible and the requirements of electron accelerators may be obviated. Moreover, the opportunity is afforded to carry out, simultaneously, monomer formation, surface activation and grafting of monomer.

The invention will now be described with reference to the following specific examples, which are not to be construed as limiting the invention thereto.

EXAMPLE 1

A textile surface formation, comprising a knitted product of polyethyleneterephthalate fiber material, was treated in accordance with the invention, by means of electron bombardment. The vacuum vessel contained high-voltage conducting flat area electrodes having a width of 30 cm and a length of 8 cm, the sides of which face away from the textile surface to be bombarded were shielded by a grounded metal sheet which was situated 0.7 cm away from the area electrode. The sides of the electrodes which faced the textile surface were selectively covered with aluminum, so chosen, so that, in connection with the discharge gas, the desired intensity of the secondary electron emission took place during ion bombardment. (In fact, the entire electrode was coated with aluminum.) Oxygen was used as discharge gas. The textile surface formation which was to be bombarded was guided symmetrically between two area electrodes spaced at a distance of 8 cm. When employing a high voltage of 1 kilovolt, a treatment atmosphere of 5 Pascal oxygen, and a power density of 1 Watt per square centimeter, the textile surface formation was at such a speed guided between the area electrodes, that the treatment period lasted for 2 seconds. This processing produced effects which could also have been attained by using known ionized gas treatment methods which, however, take considerably longer.

The thus treated polyethyleneterephthalate surface formation was processed for 30 minutes, under an inert gas rinsing, with a 10% hydrous acrylic acid solution. A mass increase of 3% was obtained. This increase resulted in permanent anti-static properties in the formation.

Further, when the treated polyethyleneterephthalate surface formation was dipped into an acid dye solution, there was an increase height of 18 cm after a period of 15 minutes due to the wicking action, while a rising of only 2 cm was measured at the untreated comparison sample. The dirt-absorbing tendency of the treated polyethyleneterephthalate surface formation was therefore considerably reduced and the soil release property was considerably improved.

EXAMPLE 2

In the manner according to Example 1, a textile surface formation of polyester fiber material was processed; however, the electrode surfaces were covered with polytetrafluoroethylene and the discharge was energized by a high frequency generator, with a frequency of 3 Megahertz. Argon was used as the discharge gas.

Under the influence of the argon ion bombardment polymer fragments and electrons were emitted from the polytetrafluoroethylene surface. The treatment atmosphere became enriched with polymerizable degradation products of the polytetrafluoroethylene which polymerized, under the influence of the electron bombardment, on the polyester. The textile surface formation of polyester fibers became, in this manner, permanently, hydrophobic.

EXAMPLE 3

The processing of textile surface formations specified in Examples 1 and 2, was limited to only one side of the processed stock, whereby under a symmetric arrangement of the area electrodes, with the processed stock guided on the symmetry axis thereof, one of the two area electrodes was disconnected. The treatment of only one side of the formations saved energy. Also, for the purpose of unilateral modification, the processed stock was guided in two layers past the area electrodes and, in this way, the processing productivity was doubled, of course, only the outer sides of the formations were modified.

EXAMPLE 4

A sheet of polyethyleneterephthalate is treated in the manner according to Example 1. As a result, its surface properties were altered in a manner whereby its wettability, measured by the edge angle of applied drops of liquid, was considerably improved.

What is claimed is:

1. In a method for modifying the surface of a polymeric substrate material by means of electron bombardment in a low pressure gas discharge medium including a pair of stationary, spaced apart flat electrodes, the improvement which comprises guiding said substrate material past said electrodes and between and in parallel with said electrodes, negatively biasing said area electrodes against said medium, shielding the sides facing away from said substrate material with a grounded similarly parallel metal sheet, covering said electrodes on the sides facing said substrate material with a conductive material chosen for effecting the desired intensity of the current density, a dark space being formed in front of said area electrodes, said substrate material being situated at a distance from said flat electrodes greater than said dark space disposed in front of said area electrodes.

2. The method according to claim 1 wherein said material covering said electrodes is silicon dioxide and said discharge gas is argon.

3. The method according to claim 1 wherein said material covering said electrodes is aluminum and said discharge gas is oxygen.

4. The method according to claim 1 wherein said discharge gas is a mixture of gases.

5. The method according to claim 4 wherein said mixture of gases comprises gaseous acrylic acid and argon.

6. The method according to claim 1 wherein said electrodes are coated with a polymeric material which forms monomeric material during said electron bombardment, said monomeric material in turn is polymerized by said electron bombardment and is grafted onto the surface of said polymeric substrate material.

7. The method according to claim 1 wherein said electrodes are arranged symmetrically, said substrate material being guided on the resulting symmetrical axis thereof.

8. The method according to claim 7 wherein one of said area electrodes is disconnected and only one surface of said substrate material is modified.

9. The method according to claim 7 wherein said substrate material is guided in two layers past said electrodes along said symmetrical axis thereof.

10. The method according to claim 1 wherein said electrodes are covered with a non-conductive material.

11. The method according to claim 1 wherein said polymeric substrate material is in the form of a woven textile material formed from polymeric textile fibers.

12. The method according to claim 1 wherein said polymeric substrate material is in fiber form.

13. The method according to claim 1 wherein said polymeric substrate material is in sheet form.

14. The method according to claim 3 wherein said polymeric substrate material is in the form of a woven textile material formed from polymeric textile fibers.

15. The method according to claim 6 wherein said electrodes are coated with polytetrafluoroethylene polymer material and said discharge gas is argon.

16. The article produced according to the method of claim 1.

17. The article produced according to the method of claim 2.

18. The article produced according to the method of claim 4.

19. The article produced according to the method of claim 6.

20. The article produced according to the method of claim 11.

21. The method of claim 1, wherein the dark space occurs in front of each of the electrodes and the distance between the area electrode and the substrate material on either side thereof is within the range of from 2 to 5 cm with the result that said distance is from 2 to 5 times greater than said dark space.

22. The method of claim 1, wherein polyethyleneterephthalate textile material is treated under a voltage of the order of magnitude of 1 kilovolt and a capacity density of the order of 1 watt per square cm for a treatment period of the order of 2 seconds.

23. In a method of modifying the surface of a polymeric substrate material by means of electron bombardment in a low pressure gas discharge medium including a pair of flat, rectilinear, spaced apart electrodes immovably mounted within a vacuum chamber, the improvement comprising:
   a. negatively biasing the area electrodes against the gas discharge medium;
   b. shielding both said electrodes on the sides facing away from the substrate material with a grounded metal sheet extending parallel to the path of the substrate material;
   c. covering both said electrodes on the sides facing said substrate material with a material chosen to effect the desired amount of Gamma secondary electrons and thus in combination with the gas discharge medium the desired intensity of the current density; and
   d. guiding the substrate material in a path spaced from and parallel to said flat electrodes and between the same at a distance from the electrodes greater than the dark space formed in front of each of said area electrodes.

24. The method of claim 23, in which the material covering both said electrodes on the sides facing the substrate material is selected from the group consisting of aluminum and silicon dioxide and the gas discharge medium is selected from the group consisting of oxygen and argon, respectively, so as to produce with the combination of aluminum and oxygen a high treatment intensity and so as to produce with the combination of silicon dioxide and argon a low treatment intensity, resulting from an increase and decrease respectively in the desired amount of Gamma secondary electrons.

25. The method of claim 23, in which the material covering said electrodes on the side facing said substrate material is aluminum and the gas discharge medium is oxygen.

26. The method of claim 23, in which the material covering said electrodes on the sides facing the substrate material is silicon dioxide, and the gas discharge medium is argon.

27. In a method of modifying the surface of a polymeric substrate material by means of electron bombardment in a low pressure gas discharge medium within a vacuum chamber and including a pair of stationary, spaced apart flat electrodes between which the material passes, said electrodes being shielded on the side facing away from the line of passage of the substrate material with a grounded metal sheet, said electrodes being covered on the sides facing the line of passage of the substrate material with a material chosen to produce in combination with the gas discharge medium a desired amount of Gamma secondary electrons and thus the desired intensity of current density, said area electrodes being negatively biased against said gas discharge medium, the improvement comprising the step of guiding the substrate material passed said electrodes and between and in parallel therewith at a distance from said electrodes greater than the dark space formed in front of said electrodes.

* * * * *